United States Patent
Iwasa et al.

(10) Patent No.: US 6,953,113 B2
(45) Date of Patent: Oct. 11, 2005

(54) CONVEYANCE UNIT AND BOXING UNIT HAVING THE SAME

(75) Inventors: Seisaku Iwasa, Ritto (JP); Yoshinori Oishi, Kakogawa (JP)

(73) Assignee: Ishida Co., LTD, Kyoto (JP)

( * ) Notice: Subject to any disclaimer, the term of this patent is extended or adjusted under 35 U.S.C. 154(b) by 0 days.

(21) Appl. No.: 10/832,287

(22) Filed: Apr. 27, 2004

(65) Prior Publication Data

US 2004/0195074 A1 Oct. 7, 2004

Related U.S. Application Data

(62) Division of application No. 10/347,302, filed on Jan. 21, 2003, now Pat. No. 6,907,980.

(30) Foreign Application Priority Data

Jan. 22, 2002 (JP) ........................................ 2002-012545

(51) Int. Cl.[7] ............................................. B65G 47/26
(52) U.S. Cl. .................. 198/419.1; 198/431; 414/798.2
(58) Field of Search ......................... 198/419.1–419.3, 198/431; 53/448, 531, 542; 414/798.2, 798.7, 799

(56) References Cited

U.S. PATENT DOCUMENTS

| | | | | |
|---|---|---|---|---|
| 4,098,392 A | * | 7/1978 | Greene | ..................... 198/419.3 |
| 4,768,642 A | * | 9/1988 | Hunter | ..................... 198/419.2 |
| 5,095,684 A | * | 3/1992 | Walker et al. | ............ 414/798.2 |
| 5,515,667 A | * | 5/1996 | Roosli | ........................... 53/542 |
| 6,419,442 B1 | * | 7/2002 | O'Brien | ................... 414/798.7 |

FOREIGN PATENT DOCUMENTS

JP          8-183505       *  7/1996

* cited by examiner

*Primary Examiner*—Richard Ridley
(74) *Attorney, Agent, or Firm*—Shinjyu Global IP Counselors, LLP

(57) ABSTRACT

A placing apparatus having first and second rear end holding members is provided between a loading apparatus that loads items in an upright position and a conveyance apparatus downstream. These rear end holding members move making a box motion when seen from the side. As a result, while the first rear end holding member holds the rearmost end of a group of items, the second rear end holding member stands by to receive a new item. The invention provides a conveyance apparatus and a boxing apparatus comprising the same that have widespread applicability. The conveyance apparatus and boxing apparatus while achieving high-speed processing, are able to convey items of varying thickness and grouped in varying numbers in a stable manner and maintained in a prescribed position.

7 Claims, 15 Drawing Sheets

CONVEYANCE UNIT AND BOXING UNIT HAVING THE SAME

This is a divisional application of application Ser. No. 10/347,302 filed on Jan. 21, 2003 now U.S. Pat. No. 6,907,980, which claims foreign priority to Japanese Application No. 2002-012545 filed on Jan. 22, 2002.

BACKGROUND OF THE INVENTION

1. Field of the Invention

This invention generally relates to the field of items processing. More specifically, the present invention relates to a conveyance unit that conveys a group of items received at an upstream side placing location to a downstream side discharge location, while holding such items group in a predetermined position. The present invention further relates to a boxing unit having such conveyance unit.

2. Background Information

Generally, food items such as potato chips are first packaged in bags and then conveyed to a boxing station by a conveyance apparatus. Then, the bags are boxed in cardboard boxes at the boxing station.

In recent years, there has been an effort in the field of items-conveyance technology to increase productivity by increasing the processing speed. Japanese Laid-Open Patent Application H5-278840 discloses an example of such a conveyance apparatus. As shown in FIG. 14, the conveyance apparatus A has first and second chains B1 and B2, which are annular and parallel to each other. The first and second chains B1 and B2 are disposed parallel to the conveyance direction of the items X . . . X, which is indicated by the arrow. Each of the chains B1 and B2 is driven independently by drive means not shown in the figure. Each of the chains B1 and B2 has a plurality of partition members C . . . C, which are disposed with a predetermined space therebetween. These partition members C . . . C form a pair of first items-holder groups D11 and D12 on the first chain B1 and a pair of second items-holder groups D21 and D22 on the second chain B2. Each of the pairs holds a predetermined number of items (ten in FIG. 14). The first items-holder groups D11 and D12 and the second items-holder groups D21 and D22 are disposed alternately in the conveyance direction.

In this manner, for instance, one of the first items-holder groups D11, which is conveyed intermittently by the first chain B1, receives ten items X . . . X from an upstream side loading conveyer E at the receiving position P1. During the placing, the other of the first items-holder groups D12 is finished with the discharge of items X . . . X, and starts moving toward the receiving position P1, being conveyed intermittently on the position shown in FIG. 14.

Meanwhile, one of the second items-holder groups D21, which has already received ten items X . . . X, is stopped at the discharge position P2 having been conveyed there by the second chain B2. A comb-shaped pusher F discharges the items X . . . X from the second items-holder group D21 all at once. During the discharge, the other of the second items-holder groups D22 is on its way to the receiving position P1, being stopped at the position shown in the Figure.

Once the second items-holder group D21 is finished with the discharge, the second items-holder group D21 starts moving toward the receiving position P1. Also, once the first items-holder group D1 is finished with the loading, the first items-holder group D11 starts moving toward the discharge position P2, where the items X . . . X are discharged. After the first items-holder group D11 leaves the receiving position P1, the second items-holder group D22 arrives at the receiving position P1, where it receives the items X . . . X from the loading conveyer E.

Through the repeating of such operations by each of the items-holder groups D11, D12, D21, and D22, it is possible to perform placing, conveyance, and discharge of the items X . . . X efficiently. As a result, it is possible to increase the speed with which the items X . . . X are processed.

In another example of a conveyance apparatus, Japanese Laid-Open Patent Application H9-104526 discloses a conveyance apparatus formed without a plurality of partitioning members, where, after a plurality of bagged items are received, these items are conveyed as a group and discharged at a discharging position as a group. As shown in FIG. 15, in this conveyance apparatus G, items X . . . X, which were loaded from an upstream loader conveyer H in a sideways position, are put into an upright position by the uprighting action, as indicated by the broken lines, of pallets J . . . J provided on an uprighting apparatus I at receiving position P1. The items X . . . X are lined up into a single line by the engagement of the tabs thereon with pole-shaped guide rails K1, K2, which are disposed to the left and right of and horizontally along the conveyance direction as indicated by the arrow in the figure. Thus the items X . . . X are kept pressed close to one another.

Then, the items X . . . X are conveyed to a discharge position P2 by a plate-shaped upright-position pusher L that moves in the manner shown by the broken lines, such conveyance being facilitated through the engagement of the right guide rail K2 and a rear guide rail K3 disposed to succeed the left guide rail K1. When the lead item X comes in contact with a stopper M, the items group X . . . X is discharged by a sheet-shaped sideways-position pusher N toward a cardboard box that is not shown in the drawing.

This conveyance apparatus G does not use partitioning members. Such a design allows the apparatus to be flexible in terms of both the dimensions of items it conveys, as well as the number of individual pieces conveyed as an items group X . . . X.

However, both the conveyance apparatuses A and G give rise to the following problems.

In the conveyance apparatus A described in Japanese Laid-open Patent Application H5-278840, the partition members C . . . C are fixedly coupled to the first and second chains B1 and B2. Therefore, in certain cases, when the type of items to be conveyed has been changed, the number of partition members C . . . C or the space between the partition members C . . . C must be changed in accordance with the thickness of the items X . . . X, as well as the number of the items X . . . X in a group. With this conveyance apparatus A, such change cannot be made right away; furthermore, the labor expended to make the change is burdensome.

In addition, because the items X . . . X are held by the plurality of partition members C . . . C, the dimensions of the item-holding spaces are usually made larger than the dimensions of the items X . . . X, given the variation in the thickness of the items X . . . X. Therefore, in order to pack the items-group X . . . X compactly into a cardboard box when the items X . . . X are discharged at the discharge position P2, there is the additional task of packing the items more tightly. This can lead to various problems such as the items X . . . X falling over or becoming disarrayed, or the bags being torn.

Meanwhile, in the conveyance apparatus G described in Japanese Laid-open Patent Application 9-104526, because the items X ... X are conveyed through the engagement of the tabs on the items X ... X with the guide rails K1, K2 and K3, only items that have tabs capable of engaging with these guide rails K1, K2, and K3 can be conveyed.

In addition, because there is no member to support the lead item X from the front, the items X ... X are not held in a stable position, and this will lead to problems, particularly in cases where high-speed conveyance is required. Furthermore, during conveyance, the bottoms of the items X ... X move along a table O, and the conveyance cannot be expected to be smooth.

In addition, in order to prevent the sideways-position pusher N and the guide rail K3 from becoming entangled with each other when the pusher N discharges the items group X ... X toward a cardboard box, a mechanism is provided that moves the rear guide rail K3 upwards, and this increases the cost.

In view of the above, there exists a need for conveyance apparatus which overcomes the above mentioned problems in the prior art. This invention addresses this need in the prior art as well as other needs, which will become apparent to those skilled in the art from this disclosure.

SUMMARY OF THE INVENTION

The purpose of the present invention is to provide a conveyance apparatus with widespread application that can, for a diverse range of items with varying thickness and grouped together in varying quantities, convey items as a group in a stable manner and in a predetermined posture, as well as to provide a boxing apparatus comprising such a conveyance apparatus.

The invention according to the first aspect of the present invention includes conveyance means, holding means and placing means. The conveyance means has an annular conveyance member that runs along the item conveyance route. The holding means is coupled to the annual conveyance member and holds an items group as the group is conveyed. The placing means loads items into holding means from outside the conveyance route. The holding means also has first and second holding members that are disposed in front and in back of an items group and holding those items. The placing means has a rear end holding member. The rear end holding member moves toward and pulls away from the conveyance route, and holds the rearmost end of an items group.

Because there are no partitioning members, the conveyance apparatus according to this invention has flexibility in terms of the thickness of the items conveyed, as well as the number of items in a group. Furthermore, it has the merit of not requiring the additional work of packing the items more tightly when the items are to be packed compactly into a box at the discharge site.

In addition, because placing means has rear end holding means that hold the rearmost end of an items group that has been received, even items that have difficulty standing on their own can be held in a stable manner by holding means. Meanwhile, even for items that are capable of standing on their own, when, for example, an annular conveyance member runs intermittently, there is the danger that items may fall backwards due to the effects of acceleration thereupon when the annular conveyance member starts running. However, with the rear end holding members, this danger is dispelled.

Furthermore, when a predetermined number of items have been received by holding means, this items group is held by first and second holding members disposed in the front and in back of holding means, and thus is conveyed in a stable manner. Therefore, there is no need to provide additional members at discharge, such as members to prevent the items from becoming disarrayed or to pack the items more tightly.

The second aspect of the present invention is the conveyance apparatus according to the first aspect, further including a control unit. The control unit controls the drive of the rear end holding members in synchronization with the placing of items.

Here, because a control unit is provided that controls the drive of the rear end holding members in synchronization with the placing of items, placing means securely receives items.

The third aspect of the present invention is the conveyance apparatus according to either of the first and second aspects, wherein the rear end holding member is constituted by first and second rear end holding members that alternately hold the rearmost end of the group of items.

According to this aspect of the invention, the rear end holding member has first and second holding members. Therefore, if, for example, the rear end of items that have been received is held by the first rear end holding member, while the second rear end holding member is standing by to receive the next group of items, then the items can be received even more securely. As a result, problems such as items becoming disarrayed or falling over during placing can be avoided.

Furthermore, to speed up the placing of items, the opportunities for the rear end holding members to move toward and pull away from the conveyance route can be increased. According to this invention, the rear end holding member has first and second rear end holding members, thus enabling an increase in such opportunities to move toward and pull away, speeding up the placing of items.

The fourth aspect of the present invention is the conveyance apparatus according to any of the first through third aspects, wherein the item is a bagged item. The first and second holding members and the rear end holding members have comb-shaped ends and hold an items group in an upright position. The first and second holding members and the rear end holding members are constituted so as to be able to pass through each other at their comb-shaped parts.

According to this aspect of the invention, because the first and second holding members and the rear end holding members are driven so that they can pass through each other at their comb-shaped sites, the moving toward and pulling away of the rear end holding members with regards to the holding means can be speeded up even further, and the group of bagged items can be securely held in an upright position.

The fifth aspect of the present invention is the conveyance apparatus according to any of the first through fourth aspects, further comprising a guide member. The guide member is provided at least on the conveyance route, and guides items along the conveyance route.

According to this aspect of the invention, a group of items held by holding means is conveyed while being guided by the guiding member provided along the conveyance route, thus preventing items being conveyed from becoming disarrayed.

The sixth aspect of the present invention is the conveyance apparatus according to any of the first through fifth aspects, wherein the space between the first and second holding members is adjustable.

According to this aspect of the invention, the space between the first and second holding members can be adjusted in accordance with the thickness of the item to be conveyed, as well as the number of items in a group, thus achieving a conveyance apparatus with more widespread application.

The seventh aspect of the present invention is the conveyance apparatus according to the second aspect, further comprising a plurality of both holding means and conveyance means; the control unit controls the drives thereof independently of each other.

According to this aspect of the invention, the placing, conveyance and discharge of items can be executed efficiently. Therefore, items can be processed at higher speed.

The eighth aspect of the present invention is the conveyance apparatus according to any of the first through seventh aspects, further comprising a loading apparatus capable of loading items on placing means in an upright position. The loading device has first, second and third belts. The first belt has a running surface that is vertical. The running surface of the second belt opposes the first belt at the placing means side, and the upstream side belt is twisted so that its running surface becomes horizontal. The third belt is disposed below the first and second belt, and its running surface is horizontal.

According to this aspect of the present invention, items supplied in a sideways position are successively put in an upright position by the first and second belts, and items can be securely loaded in an upright position at placing means, which is located downstream. In addition, because items are successively—that is, consecutively—shifted from the sideways position to the upright position, the loading of items can be carried out at greater speed than when a group of items is shifted from a sideways position to upright position all at once.

Moreover, because the third belt, which has a running surface that is horizontal, is disposed beneath the first and second belts, items sandwiched between the first and second belts and put in an upright position are also well supported at their bottoms by this third belt. Therefore, because items can be securely loaded onto placing means without making the sandwiching force between the first and second belts too large, the tearing of bags and damaging of contents due to excessive sandwiching force can be avoided.

The ninth aspect of the present invention is the conveyance apparatus according to eighth aspect, wherein the space between the first and second belts is adjustable.

According to this aspect of the present invention, the space between the first and second belts can be adjusted to fit the thickness of the supplied item, resulting in more stable conveyance of items and a conveyance apparatus that has more widespread application.

The tenth aspect of the present invention is the conveyance apparatus according to either the second or the seventh aspect, further comprising a storage unit that stores drive patterns of rear end holding member for each type of items group to be conveyed. The control unit controls drive based on the stored drive patterns.

According to this aspect of the invention, the drive patterns for the rear end holding members can be changed automatically when there is a change in items, resulting in a conveyance apparatus that can process items more quickly and efficiently.

Finally, the eleventh aspect of the present invention comprises the conveyance apparatus according to any of first through tenth aspects and an apparatus for boxing an items group discharged from the conveyance apparatus near the downstream end of the conveyance apparatus.

According to this aspect of the present invention, because it comprises a conveyance apparatus that has flexibility with regards to the thickness of the items to convey, as well as to the number of items conveyed in a group, and that can receive and hold both items that can stand on their own and those that cannot, a boxing apparatus with widespread applicability is achieved.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

The boxing apparatus in accordance with the first embodiment of the present invention will now be explained. In the following explanation, the terms "front" and "rear" refer, respectively, to the lower-stream and upper-stream sides of the conveyance direction, and the terms "left" and "right" refer, respectively, to the left and right sides relative to the conveyance direction.

<Entire Structure of Boxing Apparatus>

Figure 1:
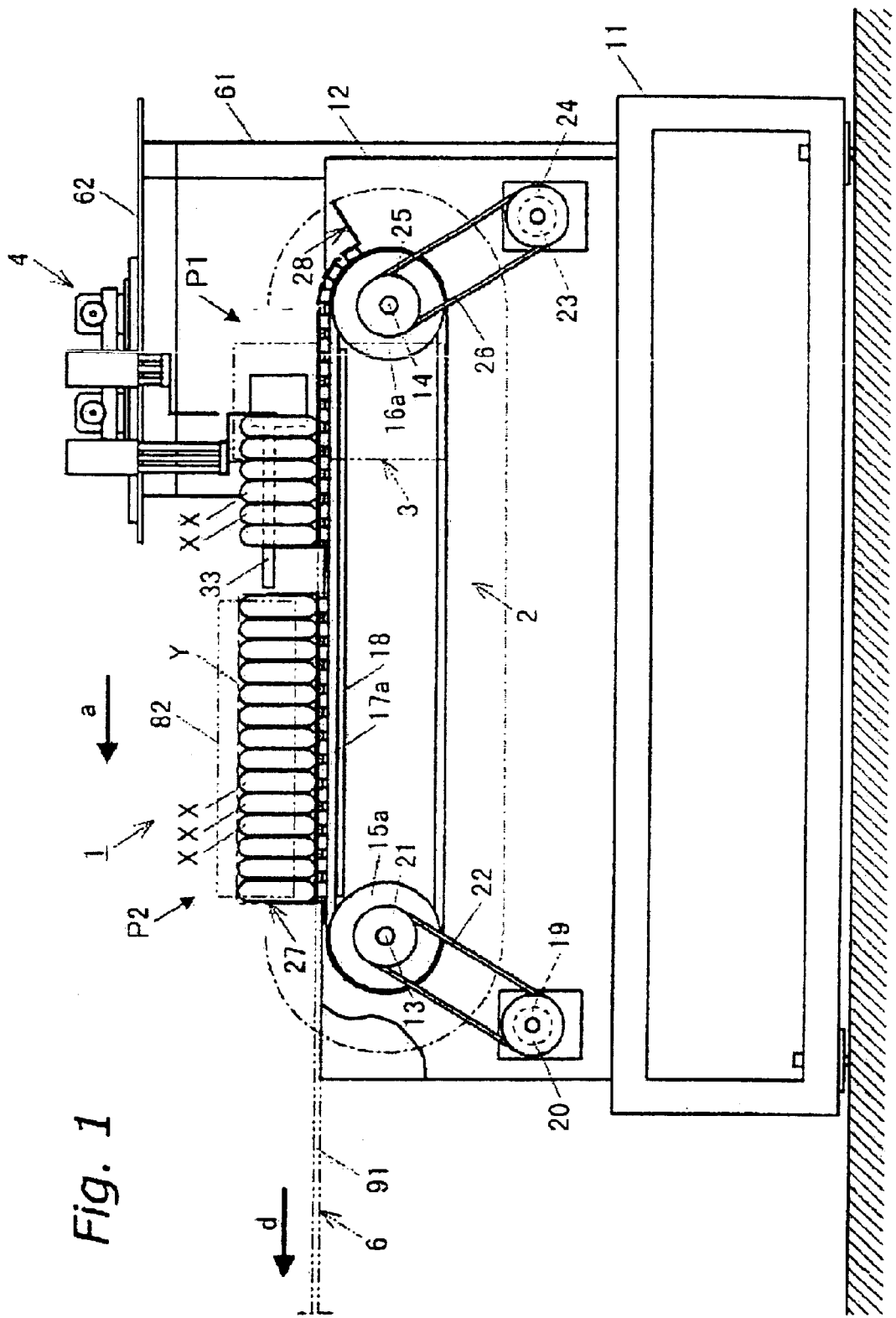
FIG. 1 is a schematic side view of the entire structure of a boxing apparatus according to a first embodiment of the present invention.
Figure 2:
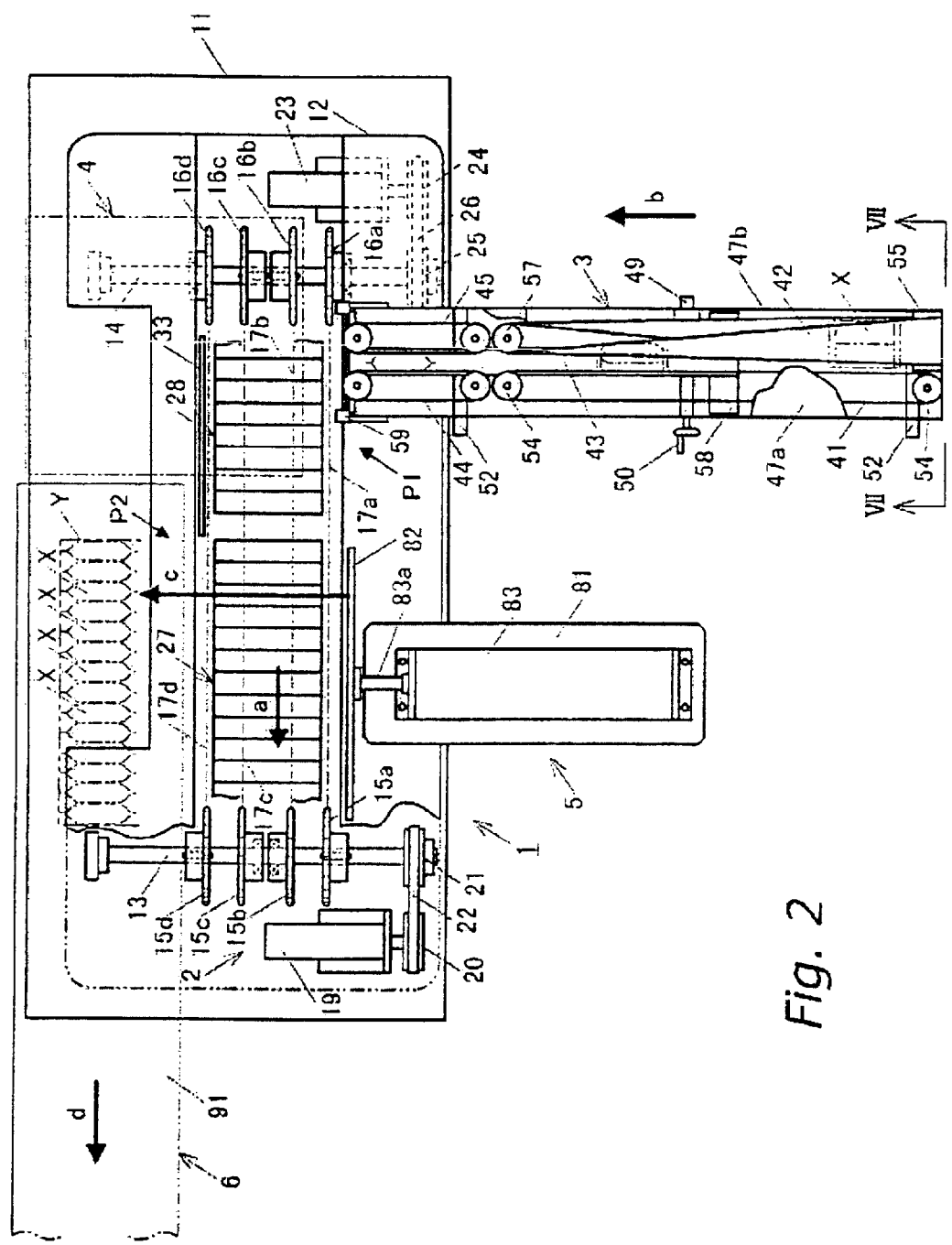
FIG. 2 is a schematic plan view of the boxing apparatus according to the first embodiment of the present invention.

As shown in FIGS. 1 and 2, the boxing apparatus 1 is an apparatus for compactly boxing items X . . . X, which are packaged bags of foodstuffs such as potato chips. The boxing apparatus 1 includes a conveyance apparatus 2 that conveys a group of items X . . . X in a conveyance direction indicated by the arrow "a"; a loading apparatus 3, disposed on the upper-stream side of the conveyance apparatus 2, that carrying in a loading direction indicated by the arrow "b" the items X . . . X supplied, for example, from a packaging apparatus disposed further upstream, and loads them onto the conveyance apparatus 2 at the receiving position P1; a placing apparatus 4 disposed near the receiving position P1 that receives items X . . . X onto the conveyance apparatus 2 from the loading apparatus 3; a discharge apparatus 5 that discharges, at a discharging position P2 and in the direction indicated by the arrow "c," items X . . . X conveyed by the conveyance apparatus 2; and an unloading apparatus (boxing apparatus) 6 that is disposed by the right side of the conveyance apparatus 2. The unloading apparatus 6 packs discharged items X . . . X into a cardboard box Y, and conveys the cardboard box Y further downstream, in the direction indicated by the arrow "d."

<Conveyance Apparatus>

The conveyance apparatus 2 includes a front/rear pair of shafts 13 and 14 rotatably axially supported within a main body frame 12 disposed on top of a base 11. At predetermined positions on the front shaft 13, four sprockets 15a through 15d are attached, and at predetermined positions on the rear shaft 14, four sprockets 16a through 16d are attached. Of these sprockets 15a through 15d, sprockets 15a and 15d are fixed to the shaft 13, while the sprockets 15b and 15c are rotatably supported by the shaft 13. Of the sprockets 16a through 16d, sprockets 16a and 16d are rotatably supported by the shaft 14, while the sprockets 16b and 16c are fixed to the shaft 14.

Each of annular chains 17a through 17d is wound, respectively, between the opposing pairs of front sprockets 15a through 15d and rear sprockets 16a through 16d. Directly below the chains 17a through 17d are receiving members 18 . . . 18, which support these chains 17a through 17d (only one receiving member is shown in FIG. 1).

A timing belt 22 is wound between a pulley 20 attached to an output axis of a motor 19 disposed toward the front of the main body frame 12 and a pulley 21 attached near the left side end of the front shaft 13. Similarly, a timing belt 26 is wound between a pulley 24 attached to an output axis of a motor 23 disposed toward the rear of the main body frame 12 and a pulley 25 attached near the left side end of the rear shaft 14.

With such a constitution, power from the motor 19 is transmitted to the sprockets 15a and 15d, enabling the chains 17a and 17d to run together, and power from the motor 23 is transmitted to the sprockets 16b and 16c, enabling the chains 17b and 17c to run together.

The conveyance apparatus 2 also includes a first items-group holding mechanism 27, coupled to and bridging the pair of chains 17a and 17d and appearing in the front in the example shown in the figures, that holds an items group X . . . X, and a rear second items-group holding mechanism 28, coupled to and bridging the pair of chains 17b and 17c, which also holds an items group X . . . X. In other words, the items-group holding mechanisms 27 and 28 can move independently of each other through the drive of the motors 19 and 23, respectively. The conveyance routes of the items group X . . . X are the routes in which the first and second items-group holding mechanisms 27 and 28 move along the chains 17a–17d between the receiving position P1 and the discharging position P2.

Next, the constitutions of the first and second items-group holding mechanisms 27 and 28 will be explained using the second items-group holding mechanism 28 as an example. As shown in FIGS. 3 to 6, a front-rear pair of first and second holding members 29 and 30, which are L-shaped when seen from the side, are provided bridging the pair of chains 17b and 17c, with a predetermined space therebetween. In addition, bottom plate members 31 . . . 31, which are elongated in the conveyance width direction, are provided between the holding members 29 and 30; in the example in the figures, 12 such bottom plate members 31 are provided. The second holding member 30 and the bottom plate members 31 are provided on top of the chains 17b and 17c, with spacers 32 . . . 32 respectively interposed therebetween. The first and second holding members 29 and 30 and the bottom plate members 31 . . . 31 are detachably supported on the chains 17b and 17c.

The ends extending upwards of the first and second holding members 29 and 30 are comb-shaped, with five cutaways 29a . . . 29a and 30a . . . 30a, formed respectively thereupon.

In addition, a guide member 33 is provided along the conveyance direction indicated by the arrow "a," extending from near the receiving position P1 to near the discharge position P2 (see FIGS. 1 and 2). Provided at the receiving position P1 side of the guide member 33 is a contact part 33a with a large surface area, against which the sides of items X received from the loading apparatus 3 can come into contact.

<Loading Apparatus>

As shown in FIG. 2, the loading apparatus 3 is an apparatus disposed on the upper-stream side of the conveyance apparatus 2, that is, at the receiving position P1, and is disposed perpendicular to the conveyance direction "a"; it loads items X . . . X supplied in a sideways position from the upstream side onto the placing apparatus 4 or conveyance apparatus 2, putting such items into an upright position.

This loading apparatus 3 includes a first belt 41 the running surface of which is vertical; a second belt 42 the running surface of which opposes the first belt 41 at the placing apparatus 4 side but is twisted so that its running surface becomes horizontal on the upper-stream side; a third belt 43 disposed beneath the first and second belts 41 and 42 that extends to near the conveyance apparatus 2 and has a horizontal running surface; and fourth and fifth belts 44 and 45, disposed on the lower-stream side of the first and second belts 41 and 42 and having vertical running surfaces that oppose each other. These belts 41 through 45 are driven by a drive source that is not shown in the figures.

Figure 7:
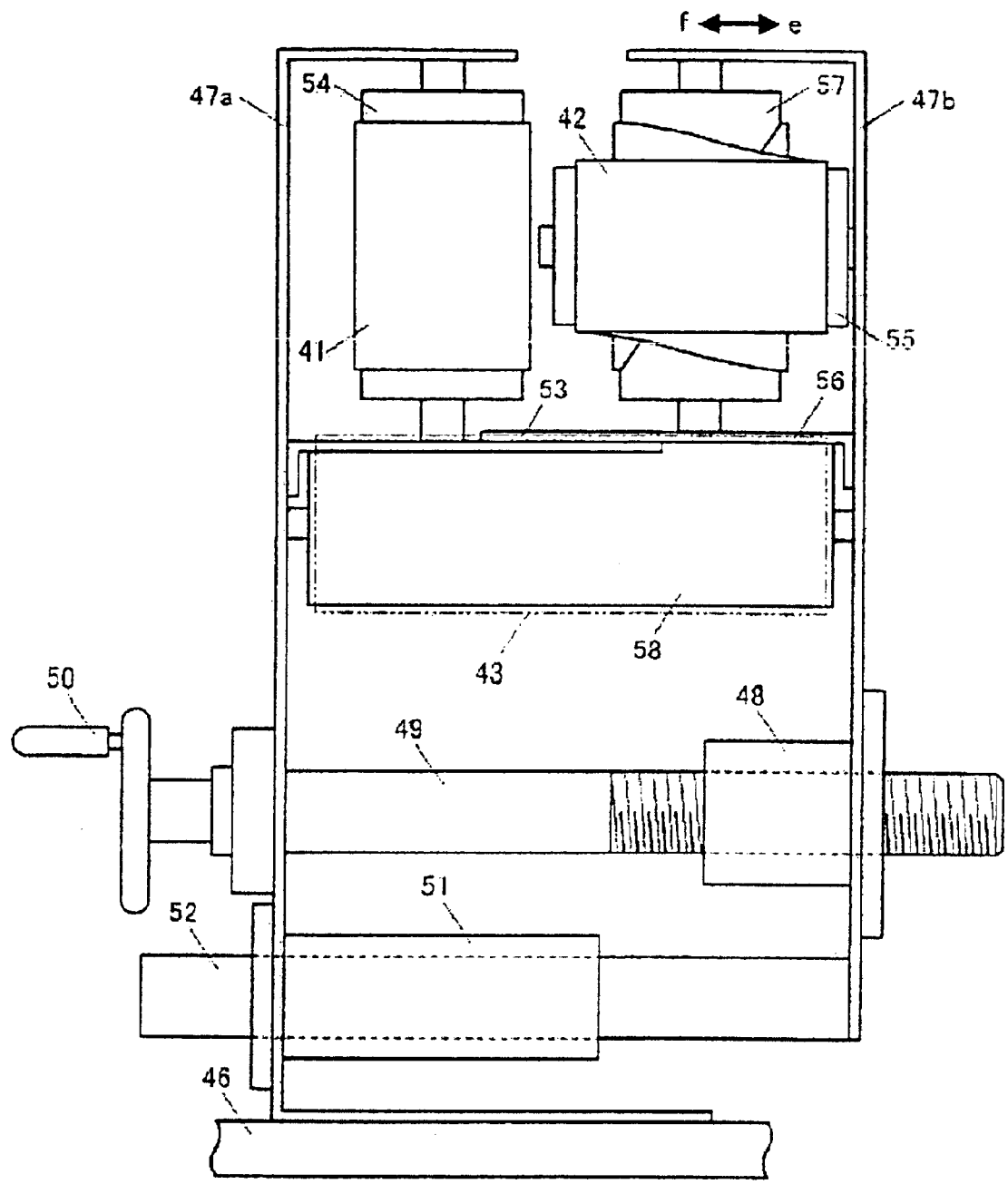
FIG. 7 is an enlarged view of the selected portion as viewed from the arrows VII—VII in FIG. 2.

This loading apparatus 3 is constituted so that the space between the first and second belts 41 and 42 and the space between the fourth and fifth belts 44 and 45 are adjustable. In other words, as shown in FIGS. 2 and 7, this loading apparatus 3 includes a side frame 47a provided on top of, and, as seen in the figures, on the left side of, the frame 46 connected to the left side of the base 1, and a side frame 47b disposed on the right so as to oppose the side frame 47a. Between the two side frames 47a and 48b, which are centered along the conveyance direction "b," a screw shaft 49 is provided that screws into a threaded sleeve 48 that is fixed to the side frame 47b; attached to the end of the screw shaft 49 that protrudes from the side frame 47a is a handle 50 for operating this screw shaft 49.

Guide rods 52, 52, which pass through sleeves 51, 51 (only the latter is shown in FIG. 7), are provided between side frames 47a and 47b, to the front and rear (in terms of conveyance direction "b") of and below the screw shaft 49, with an appropriate space therebetween; the right ends of the sleeves 51, 51 are fixed on the side frame 47b, and the left ends are fixed on the side frame 47a.

The first belt 41 is wound between a front/rear pair of rollers 54, 54 that are rotatably axially supported on the side frame 47a via a bracket 53 fixed to the side frame 47a and that make the running surface of the first belt 41 vertical; the second belt 42 is wound between a roller 55 that is rotatably axially supported on the upstream side of the side frame 47b and makes the running surface in this vicinity horizontal and a roller 57 that is rotatably axially supported on the side frame 47b via a bracket 56 fixed to the side frame 47b downstream side and that makes the running surface of the second belt 42 in this vicinity vertical.

The third belt 43 is wound around a front/rear pair of rollers 58, 58 (only the latter is shown in FIG. 7), which are rotatably axially supported between the side frames 47a and 47b. The fourth and fifth belts 44 and 45 are each wound around a front/rear pair of rollers axially supported on the side frames 47a, 47b via brackets 53 and 56.

With such a constitution, by operating the handle 50, the engagement of the screw shaft 49 and the sleeve 48 causes the side frame 47b, as it is guided by the guide rails 52, 52, to move toward or away from the side frame 47a, in the directions indicated by the arrows "f" and "e" respectively; thus the spaces between the first and second belts 41 and 42 and between the fourth and fifth belts 44 and 45 are adjustable.

In addition, a photoelectric sensor 59 is provided at the downstream end of the loading apparatus 3, for the purpose of detecting items X . . . X for loading from the loading apparatus 3 to the placing apparatus 4.

<Placing Apparatus>

Figure 3:
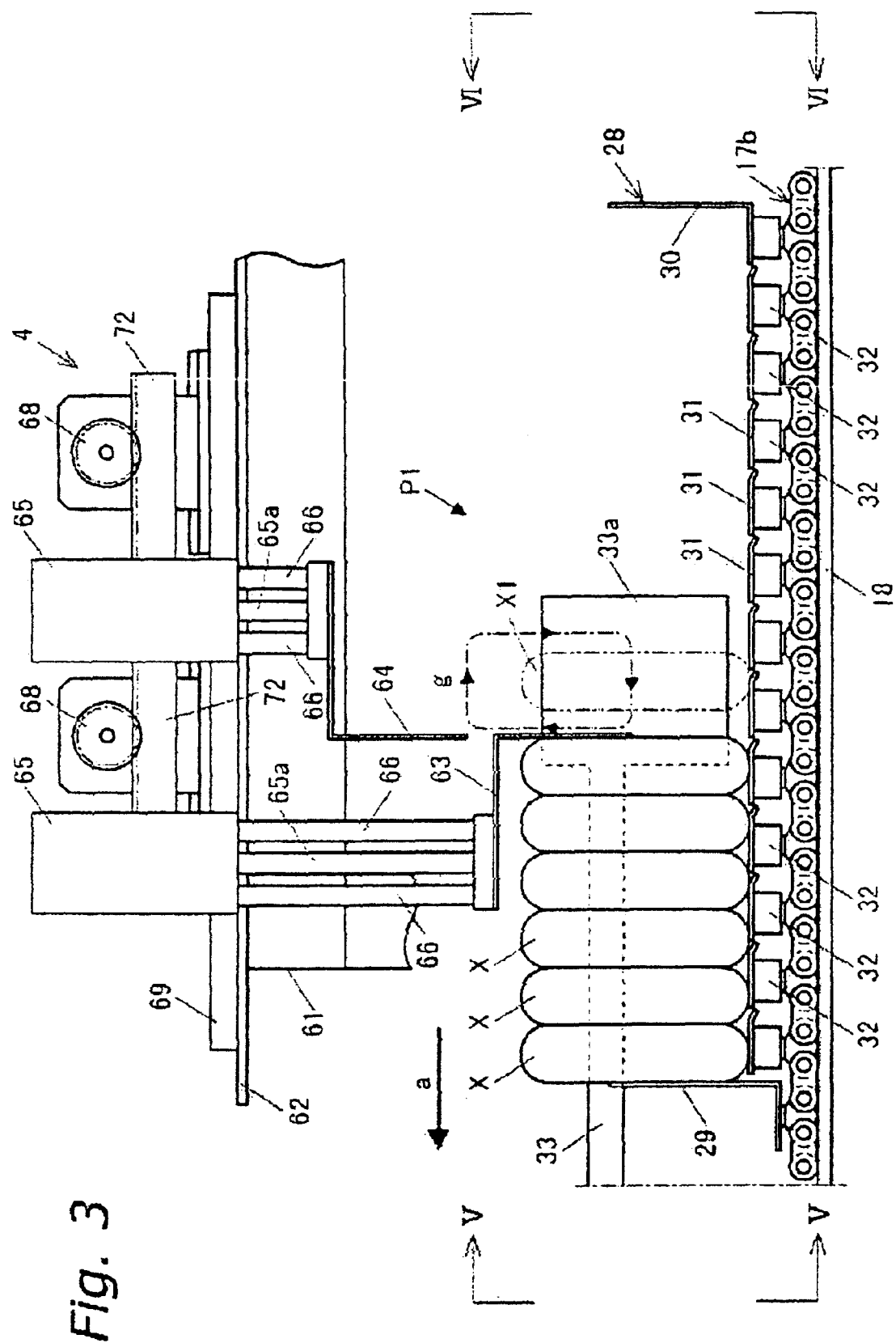
FIG. 3 is an expanded side view of a placing apparatus and an items-group holding mechanism according to the first embodiment of the present invention.
Figure 4:
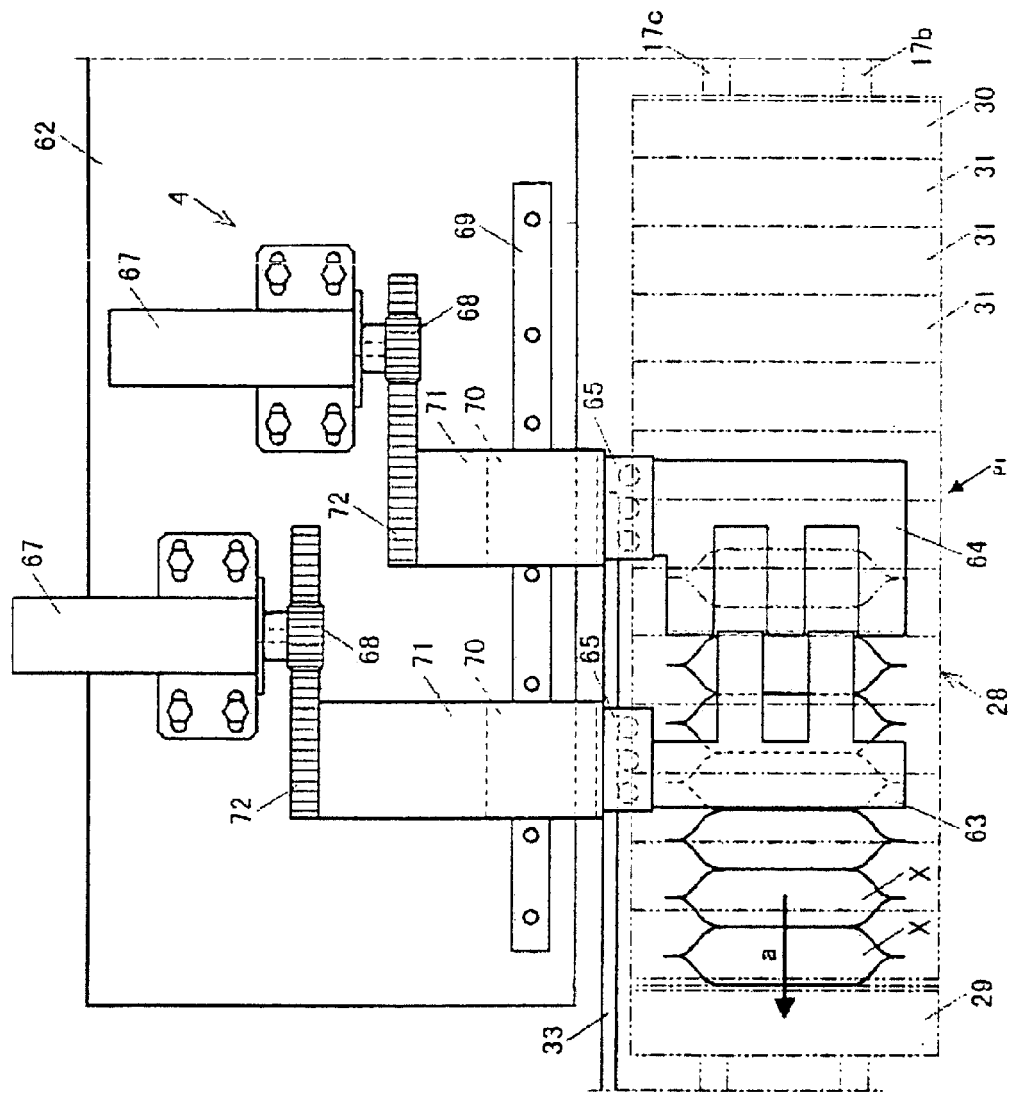
FIG. 4 is an expanded plan view of the placing apparatus and the items-group holding mechanism according to the first embodiment of the present invention.

As shown in FIGS. 1, 3 and 4, the placing apparatus 4 is disposed on a table 62 supported by a frame 61 provided on the base 11 near the receiving position P1.

This placing apparatus 4 includes first and second rear end holding members 63, 64, for securely placing items X . . . X loaded from the loading apparatus 3 onto the first and second items-group holding mechanisms 27, 28 of the conveyance apparatus 2 and for holding the rearmost end of an items group X . . . X held by these items-group holding mechanisms 27, 28; the placing apparatus 4 causes these rear end holding members 63, 64 each to execute the box motion, as seen from the side, indicated by the arrows "g."

The first rear end holding member 63, which has an L shape when seen from the side and the rear end of which extends downwards, is attached to the bottom end of a rod 65a of a cylinder 65 for causing the vertical motion of the first rear end holding member 63; the first rear end holding member 63 is supported so as to be able to move vertically, guided by two guide rods 66, 66.

A pinion 68 is attached to an output axis of a motor 67 disposed on the table 62. A long arm member 71 is fixed to a linear bearing 70 in a direction orthogonal to the conveyance direction "a." The linear bearing 70 slidably engages with a guide rail 69 disposed on the table 62. The guide rail 69 is elongated in the conveyance direction "a." On one end of the arm member 71 is fixed a rack 72, which engages with the pinion 68; on the other end, the cylinder 65 is fixed. As a result, the first rear end holding member 63 can move horizontally along the conveyance direction "a."

With such a constitution, the first rear end holding member 63 is able to execute the above-mentioned box motion. The second rear end holding member 64, which has an L shape when seen from the side and the front end of which extends downward, moves vertically and horizontally in the same manner as the first rear end holding member 63, and so an explanation of such movement will not be repeated.

Figure 5:
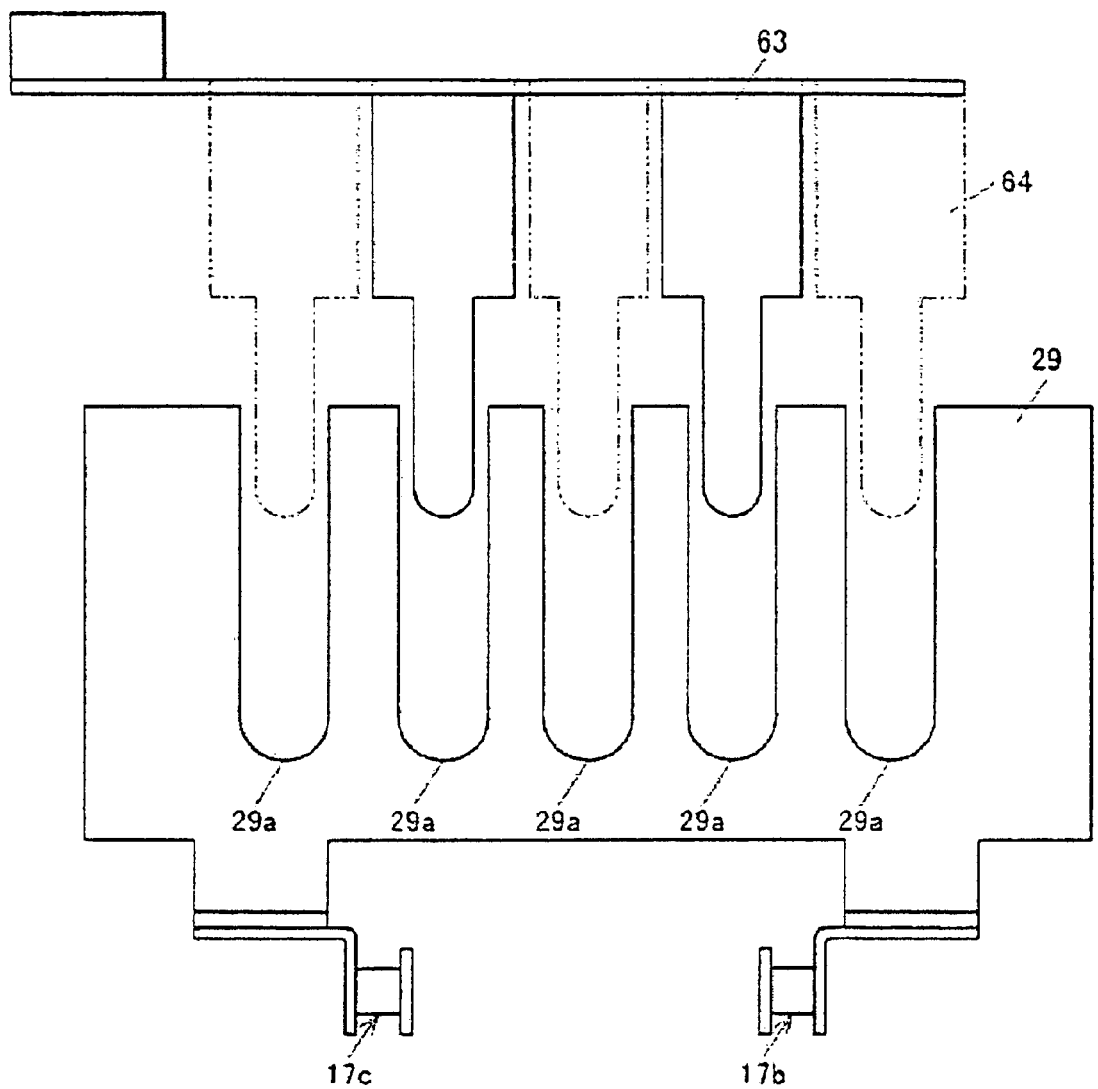
FIG. 5 is an enlarged view of the selected portion of items-group holding mechanism as viewed from the arrows V—V in FIG. 3.
Figure 6:
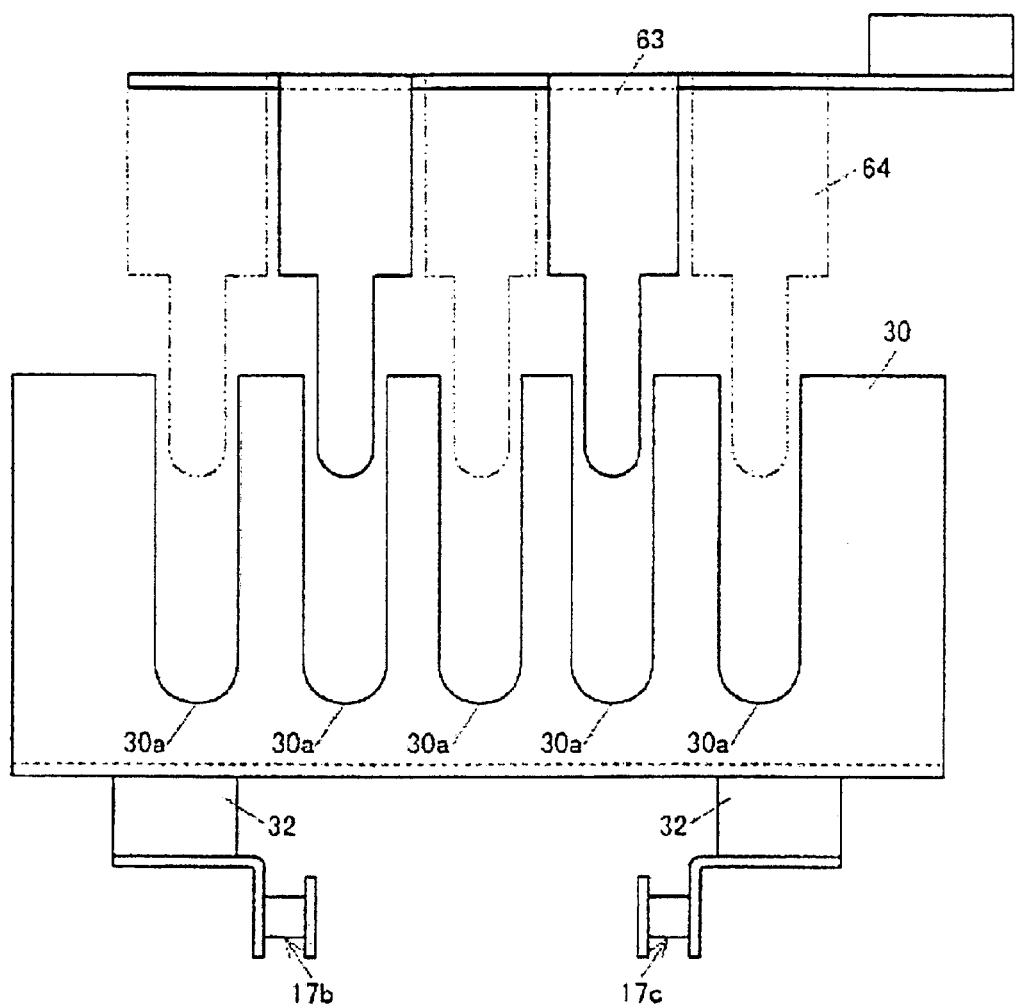
FIG. 6 is an enlarged view of the selected portion of items-group holding mechanism as viewed from the arrows VI—VI in FIG. 3.

As shown in FIGS. 4 to 6, the respective ends of the first and second rear end holding members 63, 64 that extend downwards are comb-shaped so as to be able to pass through each other; the first and second rear end holding members 63, 64 are also formed so as to be able to pass through each other in the horizontal plane. Furthermore, the ends of the first and second rear end holding members 63, 64 are formed so as to be capable of passing through the upward ends of the first and second holding members 29, 30.

<Discharge Apparatus>

As shown in FIGS. 1 and 2, the discharge apparatus 5 is disposed on a table 81 that is connected to the top surface of the main body frame 12 so as to be perpendicular to the conveyance direction "a." The discharge apparatus 5 includes a sheet-shaped pusher 82 that pushes out at once a group of items X . . . X held by the items-group holding mechanisms 27, 28 and a cylinder 83 with a rod 83a to the end of which the pusher 82 is attached; the cylinder 83 causes the pusher 82 to advance in the direction indicated by the arrow "c." It should be noted that the cylinder 83 is but one example, and that a solenoid or a motor or the like can be used to drive the pusher 82.

<Unloading Apparatus>

As shown in FIGS. 1 and 2, the unloading apparatus 6 has a table 91 connected to the upper surface of the main body frame 12 and extending along the front/rear direction. After packaging into a cardboard box Y loaded on the table 91 a group of items X . . . X discharged from the discharge apparatus 5, the unloading apparatus 6 uses suitable means to convey the cardboard box Y further downstream, in the direction indicated by the arrow "d."

<Control System>

Figure 8:
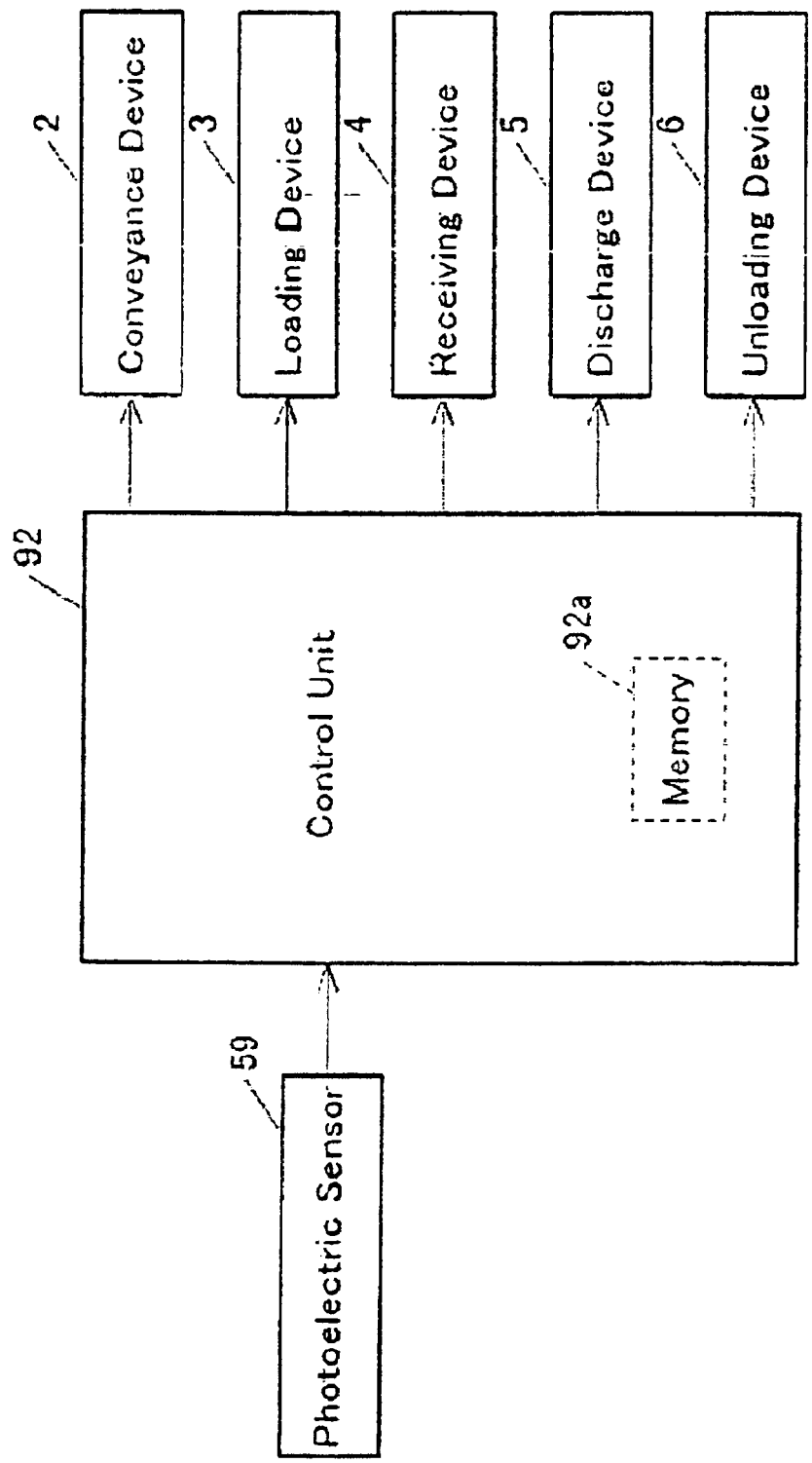
FIG. 8 is a drawing of the control system of the boxing apparatus.

FIG. 8 shows the control system for the boxing apparatus 1. The control system includes a control unit 92 that comprehensively controls the boxing apparatus 1. The control unit 92 has a memory unit 92a that stores initialization settings and a variety of control parameters for each type of item X, with a control program that controls the devices 2–6 as discussed below. The control unit 92 can also include other conventional components such as an input interface circuit, an output interface circuit, and storage devices such as a ROM (Read Only Memory) device and a RAM (Random Access Memory) device. The control unit 92 is operatively coupled to the devices 2–6 in a conventional manner. The internal RAM of the control unit 92 stores various control data. The control unit 92 is capable of selectively controlling any of the devices 2–6 in accordance with the control program. It will be apparent to those skilled in the art from this disclosure that the precise structure and algorithms for control unit 92 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 92 outputs control signals to the conveyance apparatus 2, the loading apparatus 3, the placing apparatus 4, the discharge apparatus 5 and the unloading apparatus 6; it controls the driving of these apparatuses and accepts input of detection signals from the photoelectric sensor 59.

The memory 92a stores such control parameters for each item X as movement patterns of the first and second rear end holding members 63, 64, intermittent drive timing for the chains 17a through 17d, the number of items X . . . X to be received in a group, the running speed and running time for chains 17a through 17d from the receiving position P1 to the discharge position P2, and the advancing and receding strokes of the pusher 82 of the discharge apparatus 5.

<Operations of the Boxing Apparatus>

The operations of the boxing apparatus 1 will be explained.

First, when items X are supplied in a sideways position to the loading apparatus 3 by, for example, an upstream device such as a packaging apparatus, the items X are successively put into an upright position by the first and second belts 41 and 42, and then even more securely put into an upright position by the four and fifth belts 44 and 45; after this, the items X are loaded onto the placing apparatus 4.

Because the third belt 43, the running surface of which is horizontal, is disposed beneath the first and second belts 41 and 42, the bottoms of the items X are well supported, and thus such problems as an item assuming an unwanted position or falling over are kept in check. Therefore, the item-sandwiching force between the first and second belts 41 and 42 does not have to be made damagingly large, and as a result such problems as bags tearing or contents being damaged by excessive sandwiching force are avoided.

In addition, because the items X . . . X are successively, that is, consecutively, moved from a sideways position to an upright position by the first and second belts 41 and 42, the loading of items is carried out at higher speed compared to when items are moved from a sideways to upright position in a group.

Furthermore, because the space between the first and second belts 41 and 42 and the space between the fourth and fifth belts 44 and 45 are adjustable, the spaces can be fitted to match the thickness of the supplied items X . . . X, and the conveyance of the items X . . . X becomes even more stable.

When an item detection signal has been inputted from the photoelectric sensor 59, the control unit 92, based on the control patterns for the relevant item X stored in the memory 92a, controls the respective driving for the placing apparatus 4, that is, for the first and second rear end holding members 63, 64; for the conveyance apparatus 2, that is, the chains 17a to 17d; for the discharge apparatus 5, that is, the cylinder 83; and for the unloading apparatus 6.

The operations of the first and second rear end holding members 63, 64 in the placing apparatus 4 will be explained in detail. As shown in FIG. 3, in the second items-group holding mechanism 28, the rearmost end of six items X . . . X that have already been received are held in an upright position by the first rear end holding member 63. The six items X . . . X are held closely packed, in the front by the first holding member 29 and in the rear by the first rear end holding member 63. At the position indicated by the broken line, a new item X1 is about to be loaded from the loading apparatus 3.

Figure 9:
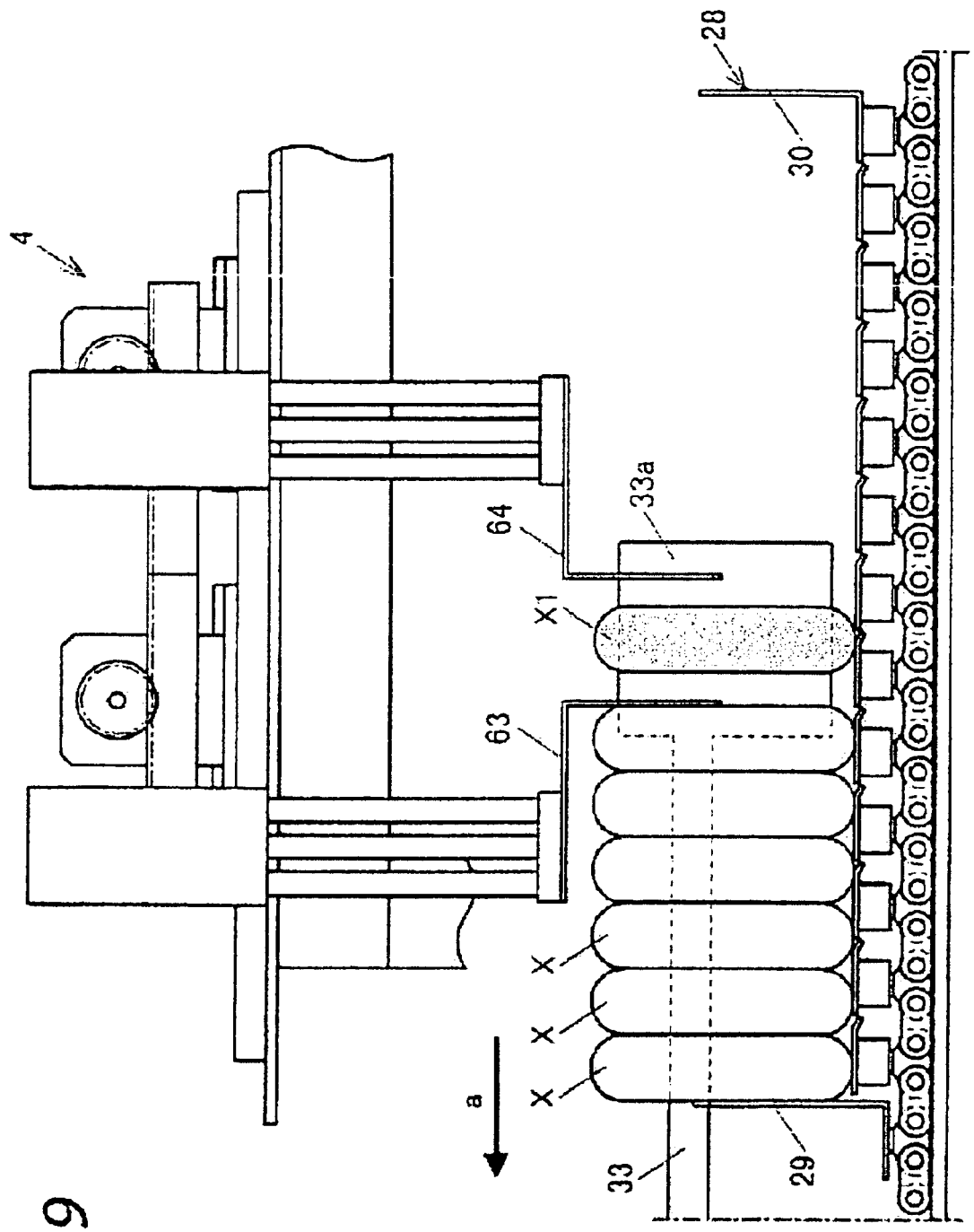
FIG. 9 is an expanded side view of the placing apparatus and the items-group holding mechanism for the purpose of explaining the operations of the placing apparatus.

Next, as shown in FIG. 9, prior to the loading of the new item X1, the second rear end holding member 64 pulls back from its position as shown in FIG. 3, and moves downward and to the rear of the new item X1 that is about to be loaded. Then, when the new item X1 has been loaded in an upright position at the aforementioned position indicated by the broken line, that is, between the first rear end holding member 63 in the front and the second rear end holding member 64 in the rear, one side of the item X1 comes in contact with the contact part 33a of the guide member 33, and the item X1 securely assumes a position on the second items-group holding mechanism 28. During that interval, the first rear end holding member 63 holds the rearmost end of the six items X . . . X.

Figure 10:
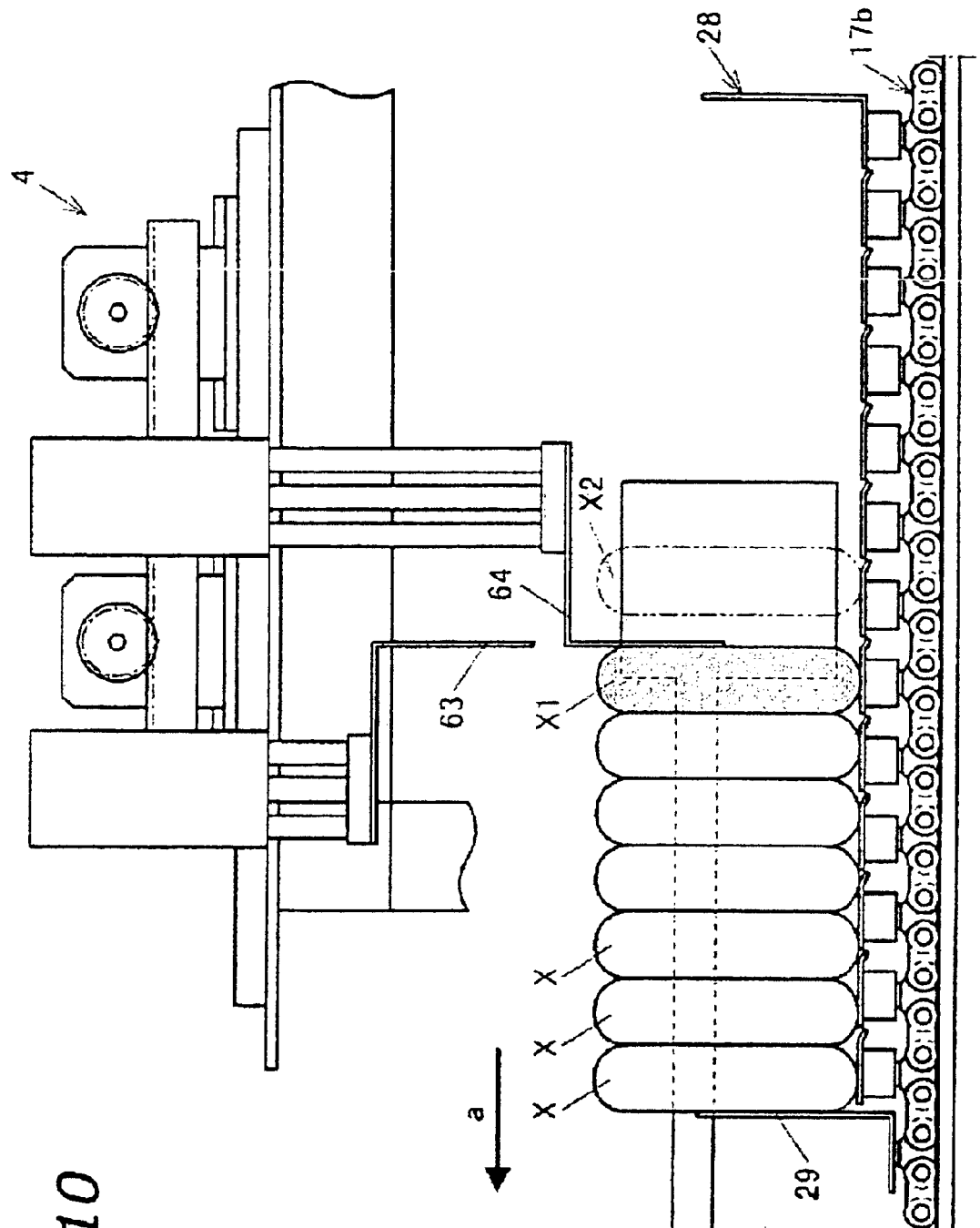
FIG. 10 is an expanded side view of the placing apparatus and the items-group holding mechanism for the purpose of explaining the operations of the placing apparatus.

Then, as shown in FIG. 10, when the chains 17b, 17c (only the chain on the left side is shown in the figure), are intermittently driven only a predetermined pitch, running in the direction indicated by the arrow "a," the first rear end holding member 63 moves upward and the second rear end holding member 64 moves forward so that it holds the rearmost end of seven items (X . . . X), including the item X1. In this manner, the seven items X . . . X are held closely packed by the first holding member 29 in the front and the second rear end holding member 64 in the rear. Then, at the position shown by the broken line, a new item X2 is ready to be loaded from the loading apparatus 3.

Figure 11:
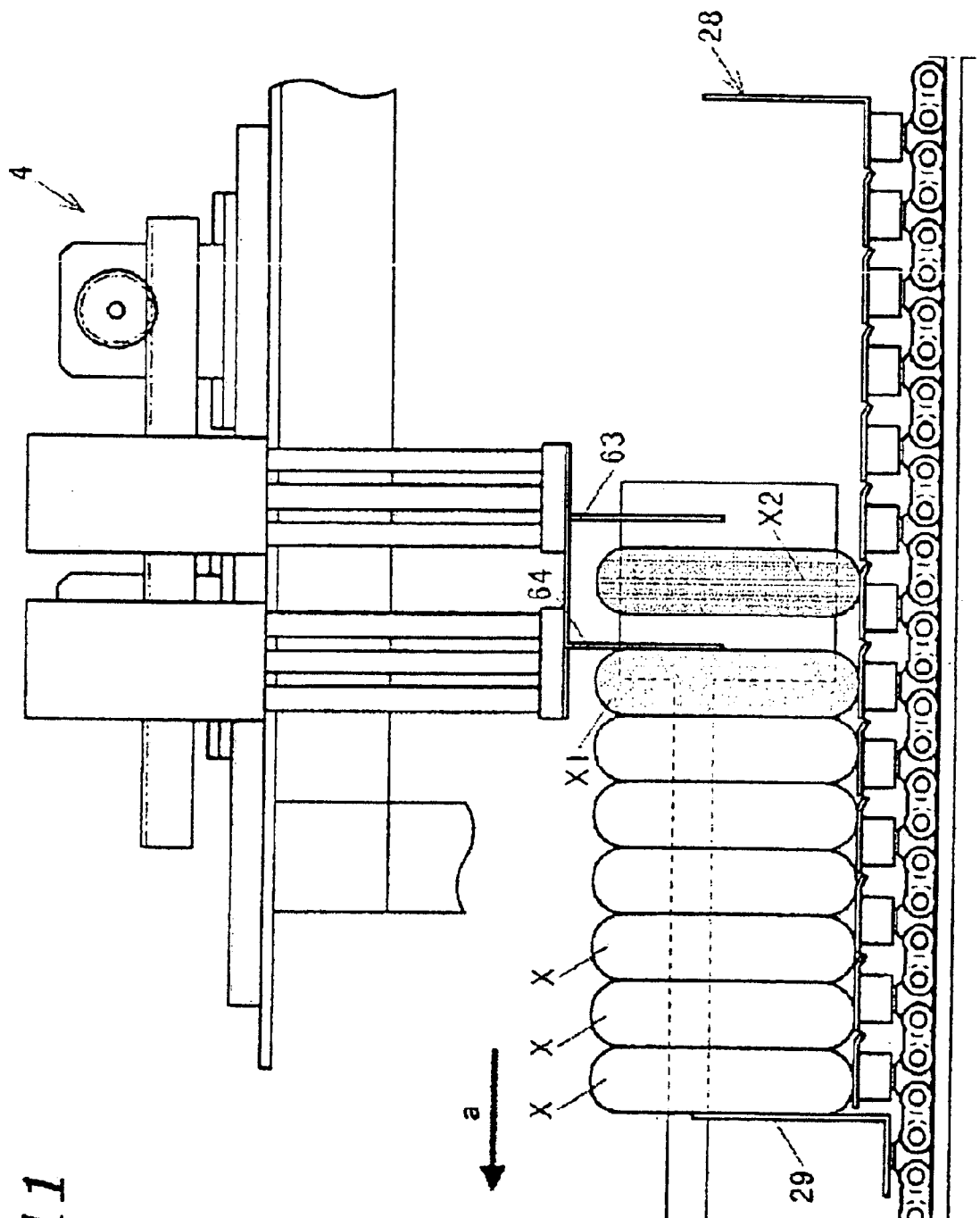
FIG. 11 is also an expanded side view of the placing apparatus and the items-group holding mechanism for the purpose of explaining the operations of the placing apparatus.

Next, as shown in FIG. 11, prior to the loading of the new item X2, the first rear end holding member 63 pulls back from its position indicated in FIG. 10 and moves downward and to the rear of the item X2 that is about to be loaded. Then, the new item X2 is loaded at the aforementioned position indicated by the broken line, that is, between the second rear end holding member 64 in the front and the first rear end holding member 63 in the rear.

In other words, because the first and second rear end holding members 63, 64 are formed so as to be able to pass through each other, the above-described movement by the first rear end holding member 63 is possible. Therefore, because the first rear end holding member 63 stands by to receive the new item X2, the item X2 can be more securely received, and problems such as the items falling into disarray or falling over when they are received can be avoided. During this interval, the second rear end holding member 64 is holding the rearmost end of the seven items X . . . X, including the new item X1.

Because the placing apparatus 4 is provided, when an item X is received from the loading apparatus 3, the rearmost end of an items group X . . . X is held by the first and second rear end holding members 63, 64; therefore, even items X . . . X that have difficulty standing on their own are held in a stable manner upright in the second items-group holding mechanism 28. Moreover, because the two rear end holding members 63, 64 are driven so that they alternate in holding the rearmost end of the items group X . . . X, the placing of the items X . . . X can be carried out with a greater speed.

In addition, there is the danger that when, for example, the chains 17b, 17c are intermittently driven, even items X that can stand on their own will fall over due to the effects of acceleration operating thereupon when the chains start running. With the rear end holding members 63 and 64, however, this fear is dispelled.

It should be noted that the first and second rear end holding members 63, 64 are formed so that they pass through, and are passed through by, the first and second holding members 29 and 30. Therefore, when, for example, the initial item X is received by the second items-group holding mechanism 28, or when the final item X is received, because the first or second rear end holding member 63 or 64 are driven so that the first or second rear end holding member 63 or 64 and the first or second holding member 29 or 30 pass through each other, placing can be carried out at higher speed.

Then, when a predetermined number of items X . . . X are received by the second items-group holding mechanism 28 (in this case, 14; see the first items-group holding mechanism 27 in FIG. 1), this group of items X . . . X are held in a stable manner by the first and second holding members 29, 30 placed to the front and rear of the second items-group holding mechanism 28.

Naturally, because the second items-group holding mechanism 28 has no partitioning members between the first and second holding members 29, 30, it can adapt to changes in the thickness of items X . . . X or in the number of items in a group. Furthermore, because the first and second holding members 29, 30 of the second items-group holding mechanism 28 and the bottom plates 31 . . . 31 can be detached and reattached from and to the chains 17b, 17c, there is even greater flexibility in adapting to changes in items. There is the additional merit that there is no need to make the items fit more tightly in the box during packaging, as is necessary in conventional conveyance apparatuses that use partitioning members.

When 14 items X . . . X are thus contained and held by the second items-group holding mechanism 28 in an upright position, the second items-group holding mechanism 28 moves them as a group to the discharge position P2.

When the chains 17b, 17c run, because the guide member 33 is provided along the conveyance direction "a," the items X . . . X held by the second items-group holding mechanism 28 are guided by the guide member 33 as they are conveyed. This prevents the items X . . . X from becoming disarrayed during conveyance.

Meanwhile, the chains 17a, 17d run, causing the first items-group holding mechanism 27, onto which prior to this 14 other items X . . . X had been loaded, to move to the discharge position 2, where it stops, as shown in FIGS. 1 and 2. Then, when the pusher 82 of the discharge apparatus 5 advances onto the conveyance route, the items X . . . X contained on the first items-group holding mechanism 27 are pushed out all at once, into the cardboard box Y placed on the table 91 opposite the discharge device 5, with the conveyance apparatus 5 interposed therebetween, so that the items X . . . X are compactly contained in an upright position, as shown by the broken lines in the FIG. 2. The cardboard box Y, containing the items X . . . X is conveyed further downstream by suitable means.

Because in this case the group of items X . . . X is held in a stable manner by the front/rear first and second holding members 29, 30, there is no need for additional members during discharge by the pusher 82, such as a member for preventing the items X . . . X from becoming disarrayed or a member for packing the items more tightly.

Figure 14:
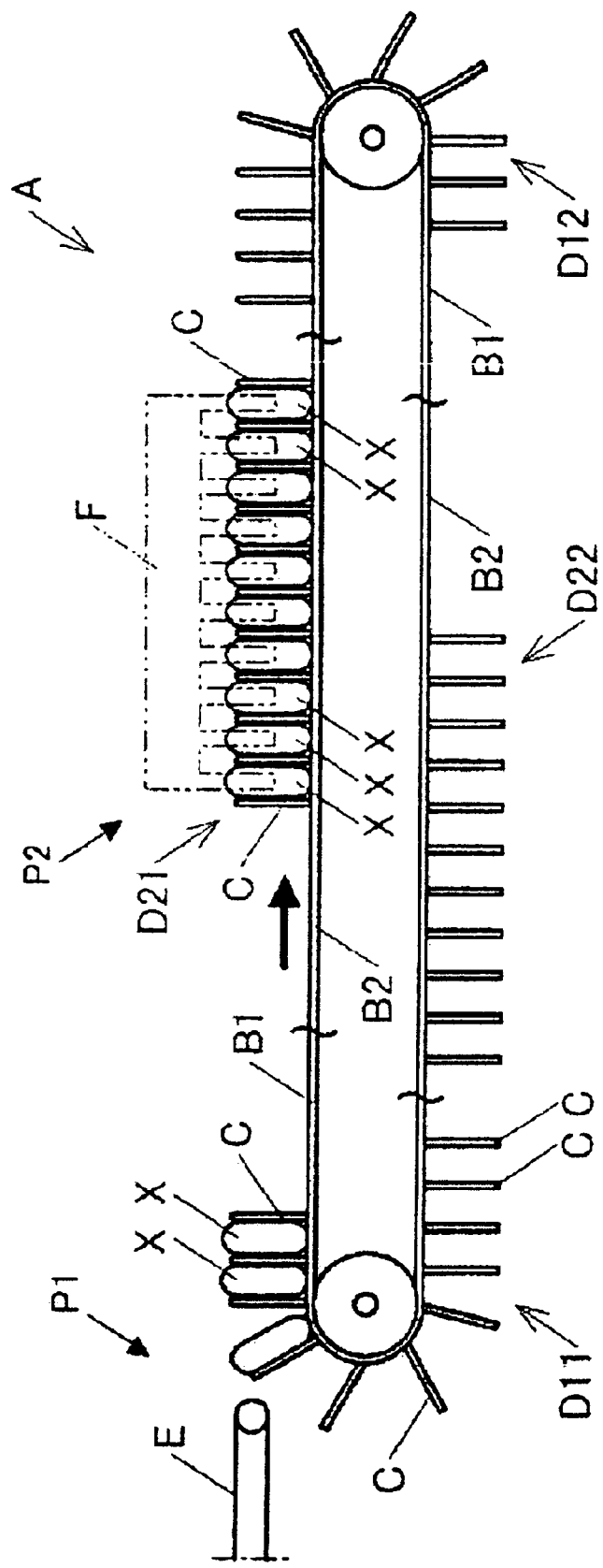
FIG. 14 is a schematic side view of a conventional conveyance apparatus.
Figure 15:
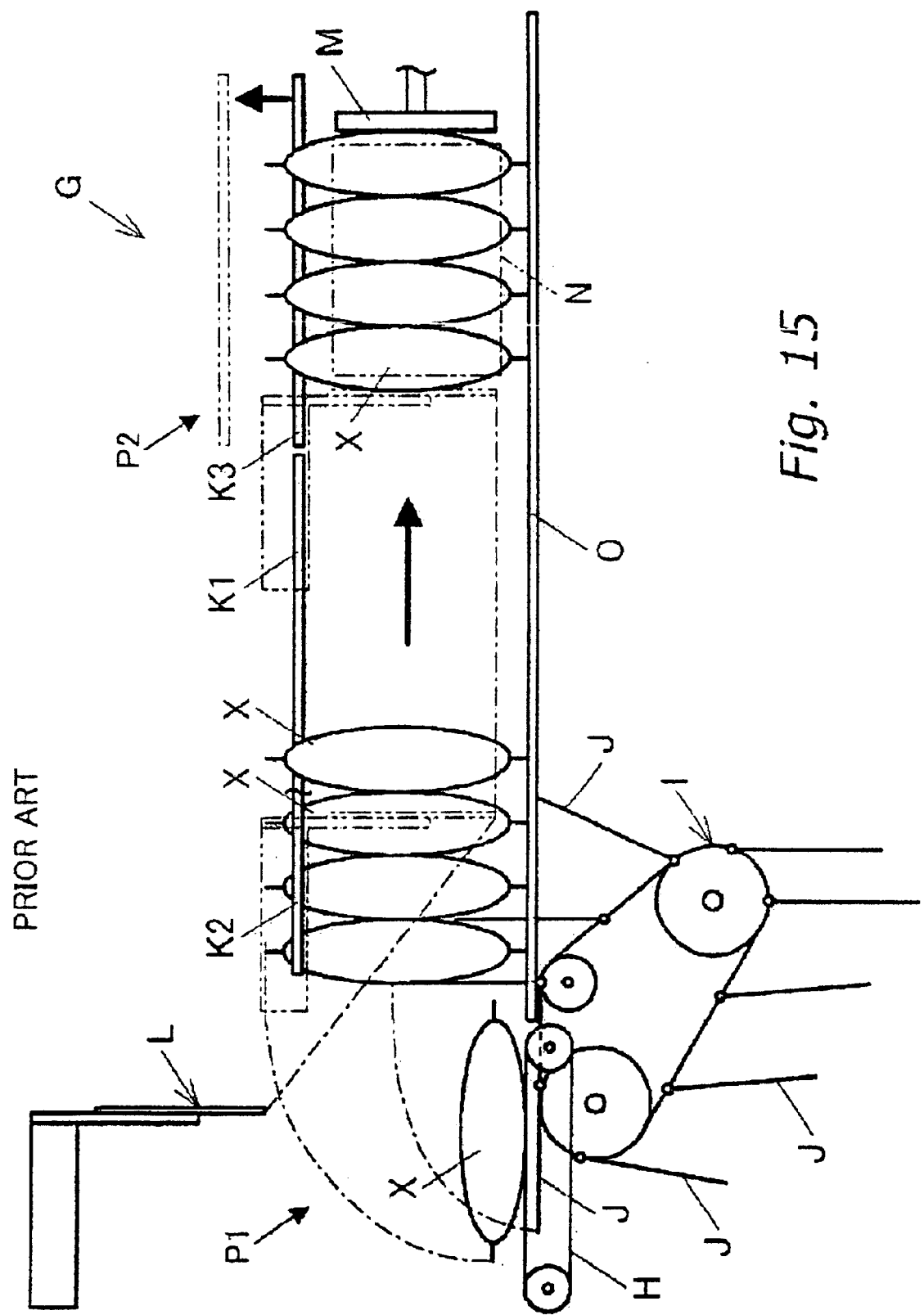
FIG. 15 is a schematic side view of another conventional conveyance apparatus.

In addition, in the case of the conventional type of items-group holding mechanism that uses a plurality of partitioning members, it is necessary to use a comb-shaped pusher (see FIG. 14). When bagged items X . . . X are pushed by a pusher, the items X . . . X can fall out of their proper positioning as a result of the tabs of the items X . . . X getting caught in the gaps between the teeth of the comb or the gap between a tooth and a partitioning member. With this embodiment of the present invention, however, these problems are avoided, as a sheet-shaped pusher 82 is used.

When all the items X . . . X have been discharged from the first items-group holding mechanism 27, the chains 17a, 17d run, causing the first items-group holding mechanism 27 to move toward the receiving position P1.

Meanwhile, the second items-group holding mechanism 28, containing 14 items X . . . X, arrives at the discharge position P2, which the first items-group holding mechanism 27 has just left, and the items X . . . X are discharged in the same manner as described for the first items-group holding mechanism 27. During this interval, the first items-group holding mechanism 27 receives the items X . . . X at the receiving position P1 in the same manner as described for the second items-group holding mechanism 28.

Thus, while the chains 17a, 17d and chains 17b, 17c are each driven independently and the items X . . . X are being discharged at the discharge position P2 from the first items-group holding mechanism 27 or the second items-group holding mechanism 28, the second items-group holding mechanism 28 or the first items-group holding mechanism 27 is receiving another group of items X . . . X from the loading apparatus 3 via the placing apparatus 4 at the receiving position P1. Therefore, these operations are performed without breaks, and the items X . . . X are processed at high speed.

Second Embodiment

A second embodiment of the present invention will now be explained.

Figure 12:
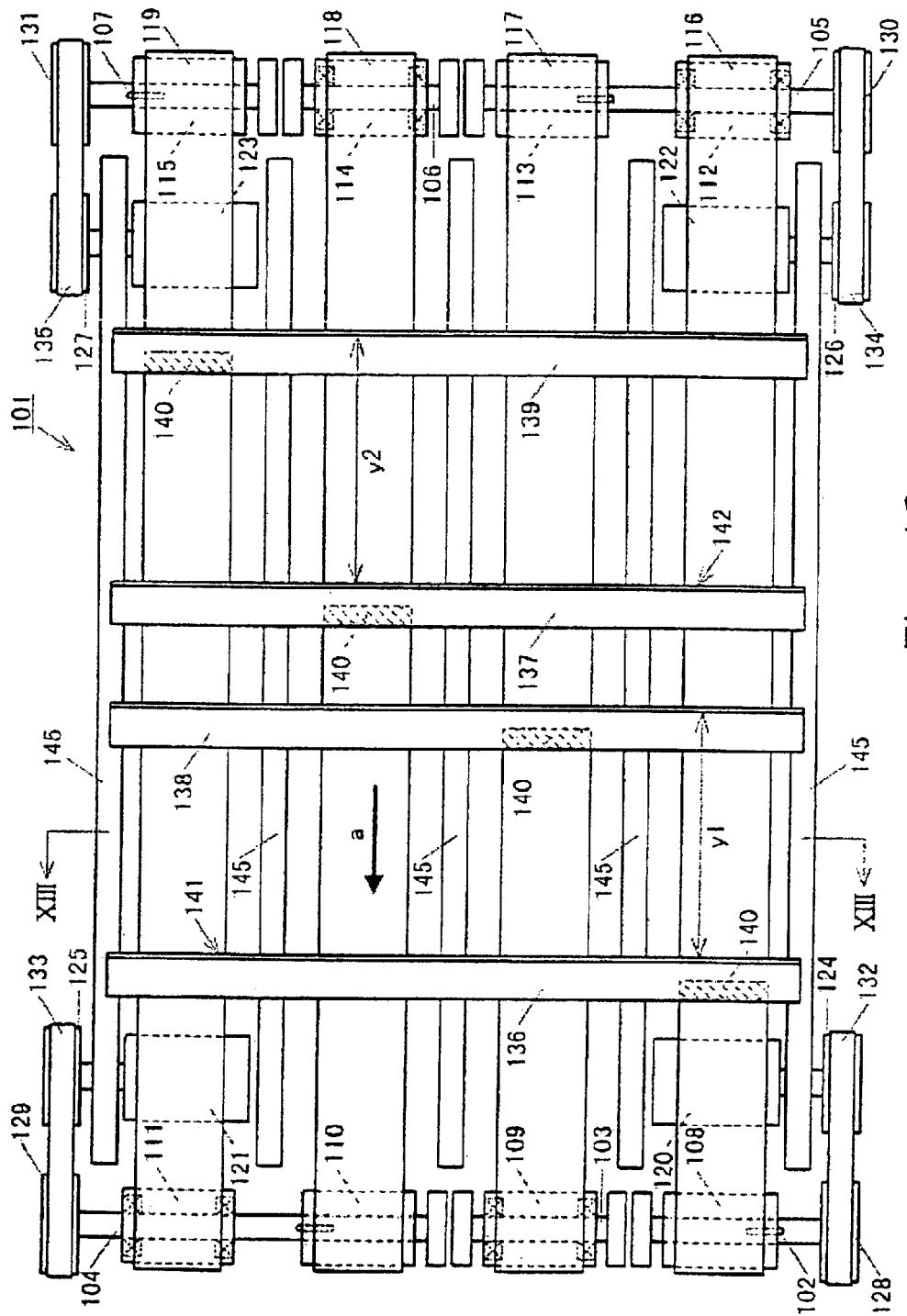
FIG. 12 is a plan view of a selected portion of a conveyance apparatus according to a second embodiment of the present invention.
Figure 13:
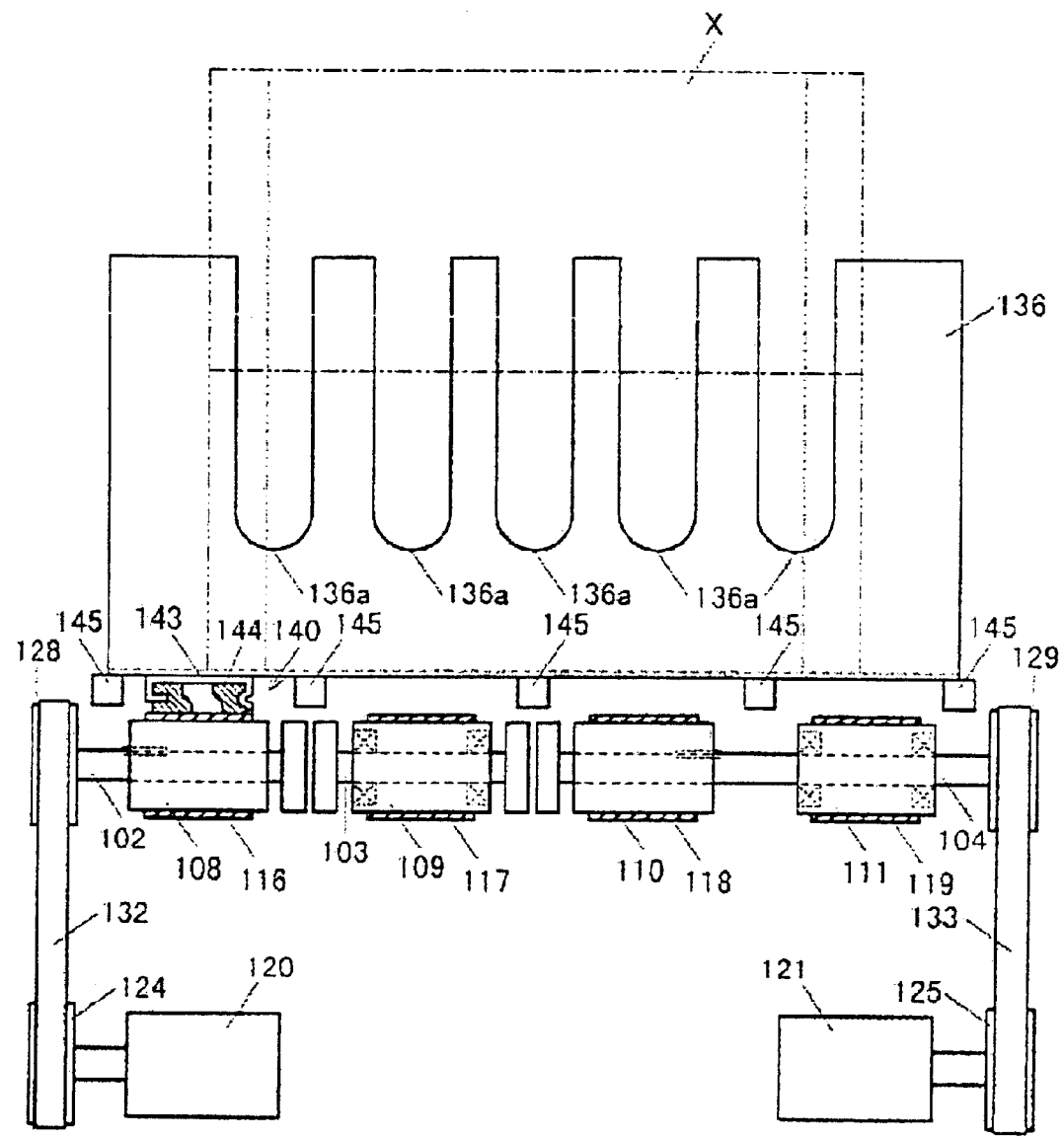
FIG. 13 is a cross-sectional view of the conveyance apparatus according to the second embodiment of the present invention, viewed from along the XIII—XIII line in FIG. 12.

As shown in FIGS. 12 and 13, a conveyance apparatus 101 conveys a group of items X . . . X (FIG. 13 shows only one), while holding them in an upright position, in the direction indicated by the arrow "a." This conveyance apparatus 101 includes six shafts 102 to 107 that are rotatably axially supported on the front and rear of a frame not shown in the figures. A roller 108 is attached to the front left shaft 102, a roller 109 is attached to the front center shaft 103, and rollers 110 and 111 are attached to the front right shaft 104. Rollers 112 and 113 are attached to the rear left shaft 105, a roller 114 is attached to the rear center shaft 106, and a roller 115 is attached to the rear right roller 107. The rollers 108, 110, 113 and 115 are fixed, respectively, to the corresponding shafts 102, 104, 105, and 107, while the rollers 109, 111, 112 and 114 are rotatably supported, respectively, on the corresponding shafts 103 to 106.

One of annular conveyance belts 116 to 119 is wound around each pair of opposing front/rear rollers 108 to 115. Each of timing belts 132 to 135 is wound, respectively, around one of pulleys 124 to 127 connected to the output axes of motors 120 to 123 disposed front and rear on the right and left below the annular conveyance belts 116 to 119 and the pulley from among pulleys 128 to 131 corresponding to the respective pulley 124 to 127 and connected to one end of one of the front and rear left and right shafts 102, 104, 105 and 107.

With such a constitution, the power from each of the motors 120 to 123 is transmitted, respectively, to the corresponding shaft 102, 104, 105 or 107; motor 120 independently drives conveyance belt 116, motor 121 independently drives conveyance belt 118, motor 122 independently drives conveyance belt 117, and motor 123 independently drives conveyance belt 119.

First holding members 136 and 137 and second holding members 138 and 139, which have an L shape when seen from the side and are formed in a comb shape because of five cutouts 136a . . . 136a provided on the respective ends thereof that rise upwards, are attached onto the upper surfaces of the conveyance belts 116 to 119 in an alternating manner, in the conveyance direction "a," and in a detachable manner, via detaching/attaching mechanisms 140 . . . 140. The front first items-group holding member 136 and second items-group holding member 138 constitute a first items-group holding mechanism 141, and the rear first items-group holding member 137 and second items-group holding member 139 constitute a second items-group holding mechanism 142.

The first and second holding members 136 to 139, at their comb-shaped parts, are able to pass through, and be passed through by, for example, the comb-shaped ends that extend downwards of the first and second rear end holding members 63, 64 described above in the first embodiment.

In the example shown in FIG. 13, the detaching/attaching mechanism 140 is provided between the first holding member 136 and the conveyance belt 116. The detaching/attaching mechanism 140 includes a hook member 143, which is a plate spring fixed to the bottom surface of the first holding member 136, and a receiving member 144 fixed to the upper surface of the conveyance belt 116. The hook member 143 engages with the receiving member 144 using left and right side portions that are formed with bent shapes that differ from each other, and two concavities provided on the left and right side, respectively, of the receiving member 144 and having differing shapes that correspond to the respective side portions of the hook member 143. Here, after the left side portion and the left concavity, which engage to a relatively deep depth, are engaged, the first holding member 136 is pushed down from above, causing the right side portion and the right concavity, which engage to a relatively shallow depth, to engage; thus the first holding member 136 is securely attached to the conveyance belt 116.

By providing the detaching/attaching mechanisms 140 . . . 140 in this manner, the attaching and detaching of the holding members 136 to 139 onto the conveyance belts 116 to 119 can be performed easily. Therefore, the holding members 136 to 139 can be easily replaced depending on such factors as the dimensions of the item X to be conveyed, providing for even more stable conveyance of the items X . . . X.

On both sides of the conveyance belts 116 to 119, support members 145 . . . 145 are disposed that extend in the conveyance direction "a" and support the bottom surfaces of the holding members 136 to 139 and the bottom ends of the items X . . . X. With such a constitution, the items X . . . X held by the first and second holding mechanisms 141, 142 are conveyed in an even more stable manner.

Moreover, the space y1 between the front first holding member 136 linked to the conveyance belt 116 and the rear second holding member 138 linked to the conveyance belt 117, namely, the item holding space in the first items-group holding mechanism 141, can be adjusted appropriately by causing either of the conveyance belts 116 or 117 to run. If, after adjustment, the running speeds of the conveyance belts 116 and 117 are controlled so as to be equal, the two holding members 136 and 138 will move in a state in which the space y1 is maintained. Similarly, the space y2 between the rear first holding member 137 and the second holding member 139, namely, the item holding space in the second items-group holding mechanism 142, can be adjusted to appropriately. The spaces y1 and y2 are usually set to be the same, but they may be set to be different.

Therefore, according to the present embodiment, because the space between the first holding members 136, 137 and the space between second holding members 138, 139 are adjustable, the conveyance apparatus 101 can be used for various application and can more easily be adjusted to the conveyance of items having differing thickness and grouped in different numbers. Needless to say, by providing this conveyance apparatus 101 in place of the conveyance apparatus 2 in the first embodiment, a boxing apparatus with even greater applicability can be provided.

Other Embodiments

In the first embodiment, the spaces between the first and second belts 41, 42 and between the fourth and fifth belts 44, 45 of the loading apparatus 3 were adjusted through the operation of the handle 50; this may be replaced with a motor or other drive source. In such a case, operational parameters for each type of item can be stored in the memory 92a, so that the setting of such spaces is performed automatically.

Also in the first embodiment, the first and second rear end holding members 63, 64 move vertically and horizontally (in this case, in the conveyance direction), executing a box motion when seen from the side; however, they may be constituted to perform a box motion when seen in a plan view, that is, a box motion within a horizontal plane. In such a case, because the rear end holding members move in the conveyance direction "a" and in the conveyance width direction, the rear end holding members can be disposed without any restrictions due to the vertical dimensions of the items X . . . X to be received, resulting in a conveyance apparatus with even more widespread applicability.

In addition, in the first embodiment, first and second rear end holding members 63, 64 were used; however, in cases where items that are particularly capable of standing on their own are received, or cases where high-speed processing at or above a certain level is not required, it would be fine to use only one of the rear end holding members.

Also, a guide member for guiding the items X . . . X discharged by the discharge apparatus 5 may be provided between the conveyance apparatus 2 and the unloading apparatus 6 in the first embodiment.

Also, a rod-shaped support member extending in the conveyance direction "a" may be provided between the conveyance apparatus 2 and the unloading apparatus 6 in the first embodiment. This support member provides greater support from the right side for the items X . . . X contained in the items-group holding mechanisms 27, 28 while they are moved or are stopped, and pulls away upward during discharge, and thus is constituted so as not to interfere with the pusher 82.

As described above, according to the present invention, a conveyance apparatus and a boxing apparatus comprising the same having widespread applicability are achieved. The conveyance apparatus and boxing apparatus, while achieving high-speed processing, are able to convey items of varying thickness and grouped in varying numbers in a stable manner and maintained in a prescribed position. The present invention is widely applicable in boxing lines and such in the field of item processing.

The terms of degree such as "substantially," "about," and "approximately" as used herein mean a reasonable amount of deviation of the modified term such that the end result is not significantly changed. These terms should be construed as including a deviation of at least ±5% of the modified term if his deviation would not negate the meaning of the word it modifies.

This application claims priority to Japanese Patent Application No. 2002-012545. The entire disclosure of Japanese Patent Application No. 2002-012545 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A conveyance unit for conveying a group of items received from an upper stream apparatus, comprising:
    a conveyance apparatus having first and second annular conveyance members that define a conveyance route of the group of items;
    a first holding mechanism coupled to said first conveyance member, said first holding mechanism having first and second holding members with a predetermined space therebetween such that said first holding mechanism holds the group of items between said first and second holding members;
    a second holding mechanism coupled to said second conveyance member, said second holding mechanism having third and fourth holding members with a predetermined space therebetween such that said second holding mechanism holds the group of items between said third and fourth holding members;
    a placing apparatus having a first rear end holding member that is movable toward and away from said conveyance route of the group of items, such that said first rear end holding member holds a rearmost end of the group of items; and
    a control unit that is operatively coupled to said placing apparatus to control said placing apparatus such that said first rear end holding member moves in synchronization with the placing of items onto said conveyance route, said control unit being further operatively coupled to said conveyance apparatus to independently move said first and second holding mechanisms.

2. The conveyance unit set forth in claim 1, wherein said first and second holding members and said first rear end holding member have comb-shaped ends, such that said first and second holding members and said first rear end holding member can pass through each other, and
    said first and second holding members and said first rear end holding member hold each item of the group of items in an upright position.

3. The conveyance unit set forth in claim 1, further comprising
    a guide member provided at least along said conveyance route, such that said guide member guides the group of items while the group of items is conveyed along said conveyance route.

4. The conveyance unit set forth in claim 1, wherein the space between said first and second holding members is adjustable.

5. The conveyance unit set forth in claim 1, wherein
    said control unit includes a memory unit storing drive patterns of said first rear end holding member for various types of items to be conveyed, and
    said control unit controls said placing apparatus based on the drive patterns stored in said memory unit.

6. The conveyance unit set forth in claim 1, wherein
    said control unit controls movements of said first rear end holding member such that said first rear end holding member makes a box motion.

7. A boxing unit, comprising:
    a conveyance unit for conveying a group of items received from an upper stream apparatus; and
    a boxing apparatus for boxing a group of items discharged from said conveyance unit near a downstream end of said conveyance unit,
    wherein said conveyance unit has:
        a conveyance apparatus having first and second annular conveyance members that define a conveyance route of the group of items;
        a first holding mechanism coupled to said first conveyance member, said first holding mechanism having first and second holding members with a predetermined space therebetween such that said first holding mechanism holds the group of items between said first and second holding members;
        a second holding mechanism coupled to said second conveyance member, said second holding mechanism having third and fourth holding members with a predetermined space therebetween such that said second holding mechanism holds the group of items between said third and fourth holding members;
        a placing apparatus having a first rear end holding member that is movable toward and away from said conveyance route of the group of items, such that said first rear end holding member holds a rearmost end of the group of items; and
        a control unit that is operatively coupled to said placing apparatus to control said placing apparatus such that said first rear end holding member moves in synchronization with the placing of items onto said conveyance route, said control unit being further operatively coupled to said conveyance apparatus to independently move said first and second holding mechanisms.

* * * * *